INVENTOR
L. A. Laursen
BY
Rogers Kennedy Campbell
ATTORNEYS

Fig. 5.

Patented Dec. 31, 1935

2,025,993

UNITED STATES PATENT OFFICE 2,025,993

MANUFACTURE OF PNEUMATIC TIRE CASINGS

Laurits A. Laursen, Akron, Ohio, assignor of one-fourth to Pearl Fisher Laursen, Akron, Ohio Application February 5, 1927, Serial No. 166,056

34 Claims. (Cl. 18—17)

This invention relates to the manufacture of pneumatic tires or tire casings, and contemplates certain improvements in all three of its different phases, viz., product, process and apparatus.

As is well known, the ordinary commercial tire casing is composed of a rubber body portion, reinforcing or load-bearing cords embedded therein, and beads or bead rings arranged at the inner edges of the casing and to which the cords are anchored, all of the constituent elements being vulcanized together as a homogeneous whole. Generally, the cords are arranged in two or more plies or layers and extend diagonally from bead to bead in opposite directions so as to cross each other in the adjacent plies, the number of plies depending upon the size of the casing, or upon the gauge of the cords, or both. In some cases, the cords in each ply or layer are cross-woven or made up in the form of a sheet of fabric or canvas, and in other cases the cords in each ply or layer are disposed merely side by side in parallel relation with no connection between them except the rubber with which they are impregnated or encased, or at times a very thin nonload bearing cotton thread which is woven through them to hold them together for convenient handling. Tire casings of the first description are commonly called "fabric tires", and those of the second description "cord tires". In using the words "cords" through the specification and claims, it is not intended to draw any distinction between the two kinds of tires, or to limit the invention to tires of any particular type, so long as they use fibrous cords in one way or another to reinforce the rubber body portion.

In commercial practice, a tire casing is usually built to tire shape in green or unvulcanized condition upon an iron core which, being collapsible, is afterwards removed and replaced by a so-called air bag. Or, according to another common method, the green casing is built up in flat or pulley-band form and then expanded into approximate tire shape, after which the air bag is inserted. In either case, the casing with the contained air bag is then placed in a suitable vulcanizing mold, the air bag inflated by the injection of air, steam or water, and the vulcanizing operation subsequently carried out. Heretofore, the green or unvulcanized tire casing has been made substantially and definitely smaller than the mold cavity, which of course determines the final size of the vulcanized casing, so that the internal pressure exerted by the air bag will expand the casing and stretch the cords to straighten them up or place them under tension before the rubber becomes set, it being understood that during this expansion of the casing the beads, which are inextensible or made by by their seating in the mold, afford fixed or anchorage points for the cords. The degree of stretch will necessarily vary for different tires, depending somewhat upon the size or type. For example, cord tires as above defined require considerable expansion owing to the fact that the parallel cords which make up the individual plies cannot be laid upon the core with any appreciable tension. The foregoing procedure, which is in practically universal use today, is expensive and has many defects, all as well known to those skilled in the art.

The general object of the present invention is to do away with the use of air bags and to carry out the vulcanizing operation under the internal pressure of water admitted directly into the interior of the tire casings, not alone to eliminate the expense and defects attending the use of air bags, but to derive the many other important advantages which come from the use of water in the manner contemplated by this invention. Numerous efforts have been made to employ direct water pressure in lieu of the air bag pressures in the vulcanization of tire casings, but these efforts have been lacking in one particular or another.

The present invention, made after long experimentation and extensive tests, has been found to answer satisfactorily all the requirements of commercial manufacture. In the first place, tire casings made in accordance with the invention have shown themselves to be of superior kind, possessing much longer life than casings made according to the old air bag process, or in fact to any prior known process. In the second place, the method by which the casings are produced has proved itself to be thoroughly efficient in actual practice, being easy to carry out and bringing about a very substantial saving in the cost of manufacture. In the third place, the standard equipment now in everyday use may be employed to a large extent in carrying out the process, and such extra equipment as may be required is of a simple and inexpensive character, so that the initial cost of installation of the new system in existing plants will be comparatively small.

The process in detail is as follows:

First—The green or unvulcanized tire casing is prepared in the usual way, that is to say, built up to tire shape on an iron core, or made in pulley-band form and then expanded into tire shape, but with this important difference, that instead of making the casing smaller than the mold cavity (which determines the final size of the vulcanized casing), it is made of substantially the same size as that of the mold cavity. The word "substantially" is employed because the casing need not exactly fit the mold cavity and as a practical matter it would be difficult to provide for an exact fit owing to the many variable factors connected with the building of green casings. However, in any case, the casing should not be made substantially smaller than the mold cavity or as small as casings made under the old air bag process, because an imperfect casing is almost bound to result for one cause or another. It has been discovered that when a green casing is subjected to the direct action of water under pressure, the water will penetrate the rubber and wet or moisten the reinforcing cords and thus tend to shrink them. If, therefore, as in the case of an under-size casing, the cords should offer so much resistance to the expansion of the casing as to permit the water pressure to build up before the casing is pressed into intimate contact with the mold walls, the water would tend to force its way past the reinforcing cords and collect in a body beyond them, allowing the cords to shrink freely on account of the equalized pressure of the water and causing ply or tread separation and other defects. No such condition can arise under the present process, for the reason that my making the casing substantially as large as the mold cavity, it is not subject to any substantial expansion when inflated with water and is pressed into intimate contact with the mold walls without imposing any substantial strain or tension upon the reinforcing cords, so that the water is afforded no opportunity to break through the casing or any of its component parts. In performing this step of the process, therefore, the iron core upon which the casing is built should be made larger than heretofore, and if old cores are employed the increased size may be given to them by padding. In the case of pulley-band tires, they need only be made wider than usual to provide for the increased size when expanded into tire shape.

Inasmuch as there may be times when there will be some slight expansion of the casing by its inflation with water, it is proposed to arrange the cords of the innermost ply or layer so that under no conditions will they be placed under greater tension or be made to bear more of the pressure load than the cords of some outer ply or layer. In other words, even though the cords of one or all of the outer plies should for any reason be stretched or tensioned by a slight expansion of the casing, care should be taken that the cords of the innermost ply or layer will not be stretched or tensioned to the same degree, if at all. This precaution is taken for much the same reasons as above indicated: e. g., if the expansion of the casing had the effect of imposing the greatest strain or load upon the cords of the innermost ply, the water, being under high pressure, would almost certainly break through the ply and cause the cords to pull away from the next outer ply, and this action might continue on throughout all of the plies. However, by arranging the cords of the innermost ply so that no load or a reduced load or strain is imposed upon them by the expansion of the casing, that ply will be pressed into intimate contact with the next outer ply or, through it, up against the ply whose cords are resisting the expansion of the casing and will thus act as a gasket to prevent the water from forcing its way through and collecting in a body between the plies. As a result, the casing will always be pressed into intimate contact with the mold walls before the water reaches the outer ply which may be resisting expansion. Once the casing is pressed into intimate contact with the mold walls under the full pressure of the water, no harmful results can occur, and any shrinkage of the cords which may take place will only serve to tension them or tighten them up from bead to bead, the pressure of the water preventing any ply or tread separation, etc.

When the casing is made in flat or pulley-band form, the desired effect may be obtained by laying the cords of the innermost ply or layer at an angle (as measured with reference to the axial plane of the tire) less than that of the cords of the outer plies or in any event of that one of the outer plies which offers the greatest resistance to expansion. For instance, if the cords of the outer plies are laid at an angle say of 35° to the axial plane of the tire, the cords of the innermost ply should preferably be laid at an angle say of 33°. These angles are only comparative, it being the practice to lay the cords at various angles according to conditions. The point is that whatever may be the angle of the cords of some outer plies, the cords of the innermost ply should preferably be placed at a lesser angle. It may be desirable at times to lay the cords of the next to the innermost ply at such a lesser angle also, or even to do the same in the case of other of the plies. As an ideal condition, the cords of all the plies could stand at different angles, increasing progressively from the innermost to the outermost ply, but this is not at all essential. In the case of a core-built casing, the disposition of the cords should be just the reverse; that is to say, the cords of the innermost ply or layer should be laid at an angle (as measured with reference to the axial plane of the tire) greater than that of the cords of the outer plies or the outer ply which offers the greatest resistance to the expansion of the casing. A two degree variation has been found to be satisfactory in many cases. For instance, if the cords of the outer ply or plies are laid at an angle of say 40° to the axial plane of the tire, the cords of the innermost ply should be laid preferably at an angle say of 42°. While not at all essential, this variation might advantageously be carried out in connection with all of the different plies, so that, for example, the cords will stand at different angles, decreasing progressively from the innermost to the outermost ply. By thus varying the angles of the cords in the two cases, all danger of ply separation or other defects is entirely obviated, even though there may be some slight expansion of the casing when inflated with water. While the angle of the cords is decreased in the one case and increased in the other, the effect is the same in both cases, namely, to relieve the cords of the innermost ply of the pressure load if and when the casing is expanded.

Instead of arranging the cords of the innermost ply at a lesser or greater angle as above described, somewhat the same effect may be secured by reducing the width of said innermost ply so that it may float or slip at the beads. Thus, instead of carrying the edges of the innermost ply down to the toes of the beads as ordinarily, they may be made to terminate a short distance above the bead toes so that the anchorage of the cords to the beads will not be too firm to prevent a slight slippage. However, the edges of the ply will be made to terminate within the zone of contact of the sealing ring (later referred to) with the inner sides of the casing, and hence the clamping pressure exerted by the sealing ring will limit the amount of slippage of the cords and finally anchor them in place.

*Second*—The green or unvulcanized casing having been prepared in the foregoing manner, it is then placed in a suitable vulcanizing mold and the interior of the casing closed by a sealing ring which fits in the space between the two beads, and against which the latter are tightly clamped when the mold sections are closed together under pressure. In the old air bag process, it is customary to "rim" the casings before placing them in the mold, that is to say, to mount them upon sectional rims which are formed with seats for the beads. Such rimming operation is also followed in the present case, the sealing ring being placed within the casing before the curing rim is applied. For certain types of molds, the casings do not require to be rimmed, the bead seats being formed wholly and directly in the mold sections, and it should be understood that the invention is equally applicable to molds of the latter type.

Heretofore, it has been the general practice to build the casing of a reduced inner diameter so that a compressive force will be exerted against the under sides or bases of the beads when the casing is mounted upon the curing rim or placed directly in the mold sections, the idea being to pinch or compact the cord plies against the under sides of the beads to insure the proper thickness of the reinforcing material at that place. This old practice is objectionable, and it has been found to be rather important in the present case to mount the casings without compression at the beads. This merely involves a slight increase in the diameter of the standard bead or bead rings, and when the parts are so modified, there is no danger of producing buckles on the inside of the casing, which buckles might not only slacken up the cords, but might also prevent the formation of a water-tight joint between the sealing ring and the inner walls of the casing.

*Third*—With the tire casing confined in the vulcanizing mold and its interior sealed in a water-tight condition, the next step is to expel the trapped air so as to prevent oxidation. While this could be accomplished in a variety of ways (as by means of a vacuum pump), it is herein proposed to make use of steam which is introduced into the sealed casing through the sealing ring, and which drives the air out through a suitable exit provided for the purpose. Any steam remaining in the casing will condense when the high pressure water enters.

This third step of the process need not be performed as a distinct or separate operation, as it will be obvious that when the water, which is heated to or above the normal curing temperature, is admitted into the casing (as next referred to), some of the water at the outset will flash into steam and produce the same effect.

*Fourth*—Being emptied of air, the tire casing is now rapidly filled with water heated to the proper temperature and under pressure substantially in excess of the temperature pressure. In some cases, as when the water is left within the casing, the water is heated to a temperature considerably above the normal curing temperature. Thus, if the curing temperature is 300° F., the water should be admitted at a temperature of say 320° F. This is important, as otherwise an undercure of the inner portions of the casing is bound to result. By way of illustration, if the water were admitted at curing temperature, there would be an instant drop in temperature due to the contact of the water with the cold surfaces of the casing and sealing ring, and no recovery could take place until the exterior heat had penetrated through the mold walls and through the rubber casing as well, which of course would take appreciable time. By introducing the water into the casing at the proper excess temperature, the unavoidable heat losses due to radiation are entirely compensated for. In other cases, as when the water is continuously circulated through the casing, the water need only be maintained at the normal curing temperature, as the heat losses are soon made up by the reheating of the water after cooling. As regards the pressure of the water, this may vary considerably so long as it is in excess of the pressure of steam at the temperature of the water, but good results have been obtained by employing a pressure in the neighborhood of 150 lbs. to the square inch. It may be desirable under some conditions to vary the water pressure at different stages.

*Fifth*—At or about the time the water is admitted into the sealed casing, heat is applied to the outside of the mold in which the casing is confined to commence the vulcanizing operation, it being understood that the casing is thus heated both externally and internally. The heating period will of course vary according to the rubber compounds employed and other well known conditions, but in actual practice it has been found to be very much shorter than that required under the old air bag process. For instance, in the case of a 29 x 4.40 casing as made by one manufacturer, the time of cure under the present process is forty minutes as compared with one hour and twenty minutes under the old air bag process. In the case of a 40 x 9 casing, the comparison is two hours and fifteen minutes as against five hours and thirty minutes. These particular curing periods (which, incidentally, refer to a full cure) are of course only mentioned for purposes of illustration, it being understood that they may vary widely with different manufacturers and different grades of stock. Such a reduction in the curing period represents a very substantial saving in itself. The water is found to have a peculiar activating effect upon the rubber compounds, hastening vulcanization and producing a more uniform cure. Moreover, by being forced into the casing, the water carries and conducts heat into the innermost portions of the rubber, so that all portions are subjected to substantially the same degree of heat, and hence are more uniformly vulcanized.

It may here be pointed out that, although it is desirable to do so, the invention is not limited in its use to the production of fully cured casings, as it is equally useful for the production of semi-cured casings, which latter, needless to say, require a shorter period of heating.

The heating of the molds may be effected in a variety of different ways. According to one common method, the molds are stacked one upon another and held together under pressure in a vertical vulcanizer or pot heater into which steam is admitted for contact with the molds. According to another common method, the individual molds are provided with steam jackets or chambers which heat the mold walls externally. The present invention is herein shown and described as adapted to both of these old methods, and hence there is no need of dealing further with them at this point. As will later be found, very few changes are necessary in the standard equipment; in fact, no changes are required in the molds or the vulcanizers, the innovations made involving merely the sealing ring, which is of special construction, and the pipe connections for handling the water, air and steam in the required manner.

Sixth—After a tire casing has been vulcanized in the above manner, the water is drained out and the casing removed from the mold. The drain connections (which may lead to a reservoir or any other place) are open to the atmosphere, and so the water will be expelled from the casing under its own pressure. When the pressure of the water drops to temperature pressure, some of the water will of course flash into steam and the drainage will thereafter be carried out under the pressure of the steam thus generated. In practice, the time consumed in draining the water from the casings will ordinarily be included in the vulcanizing period inasmuch as the heating of the casings will continue during drainage. The presence of steam at this late stage of vulcanization is not at all harmful and is really useful because the steam will pass off rapidly and allow the casings to dry out practically while still in the molds. However, in order to hasten the drainage operation it is preferred to force the water out under the pressure of air admitted into the sealed casing. After the casing has been emptied of water, it is dismounted from the curing rim if need be, and the sealing ring withdrawn for use in effecting another vulcanizing operation. Should any moisture remain in the casing, it will soon evaporate and leave the casing in a perfectly dry condition ready for use.

Such in detail are the steps followed in carrying out the new process, although, as above indicated in part, it may not be necessary to make use of all of them or to follow them in the exact order stated.

The action and effect of the water under the conditions set forth have already been touched upon to some extent, but it may be helpful to add a few comments in further explanation. As the water fills the sealed tire casing, the pressure is rapidly built up to the maximum and all parts of the casing are pressed against the mold walls with a smooth, uniform, compacting action which produces a thorough bonding of the rubberized plies and a complete amalgamation of all the component parts of the casing. In this connection, it will be remembered that the unvulcanized casing is made approximately of the same size as the mold cavity or at any rate not substantially smaller, so that the water pressure is not required or allowed to expand the casing as heretofore in pressing it into contact with the mold walls, and hence there is no stretching of the cords such as takes place under the old air bag process. Owing to the heavy pressure, the water is actually forced into the body of the casing, saturating it and eliminating trapped air and carrying the heat into the body of the casing. Comparative tests made between casings vulcanized under the old air bag process and under the present process have shown that the latter are far superior in practically every respect and possess a much longer life in service. The rubber is more thoroughly and uniformly vulcanized and is denser, tougher, stronger, and of better texture throughout, the cords are more securely and effectively embedded in and united to the rubber with better insulation, there is less internal friction and heating, the danger of ply separation is not nearly so great, and the resiliency and easy riding properties of the tires are markedly improved. The quality of the rubber is also much improved, due perhaps to the absorption of water by the rubber during vulcanization, the casings aging more slowly and manifesting little or no free sulphur blooming.

A description of the apparatus will now be given, reference being had to the accompanying drawings, in which.

Figure 2:
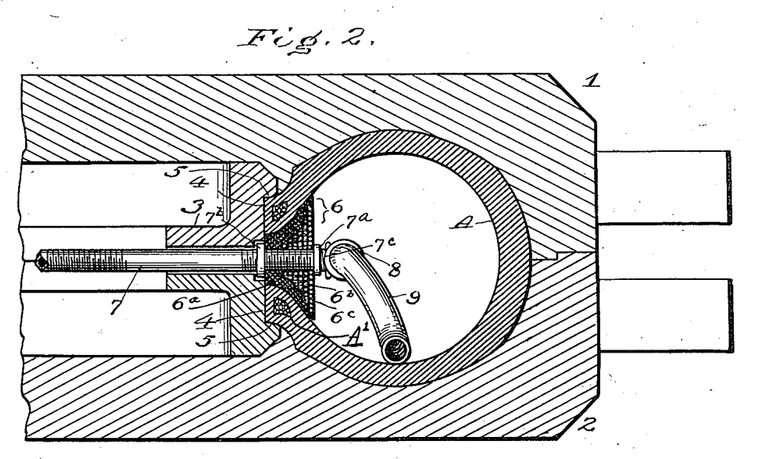
Fig. 2 is an enlarged transverse section taken through one of the molds and showing a green or unvulcanized tire casing placed therein ready to be vulcanized.

Referring first to Fig. 2, the vulcanizing mold therein shown is of standard construction, comprising top and bottom sections 1 and 2 formed with a suitable cavity which determines the final size and shape of the vulcanized casing. The mold is shown as enclosing a green or unvulcanized tire casing A, which, it will be observed, is made to fill the mold cavity, so that there will be no stretching of the cords when the casing is inflated with water. For non-skid casings, the mold sections will be formed with pockets or depressions to give the particular tread design desired, but these depressions have been omitted from the drawings for the sake of clearness. The casing is mounted, as usual, upon a sectional curing rim 3, which when placed in the mold forms a part thereof and which is formed with seats for the beads or bead rings $A^1$, these seats being constituted by the plain cylindrical outer faces 4 of the rim sections and the curved inner faces of the side flanges 5 with which the rim sections are provided. For the reasons previously noted, the diameter of the beads or bead rings is greater than that of the standard beads, being such that when the casing is rimmed up the under sides or bases of the beads will fit snugly upon said rim faces without compression.

The interior of the green or unvulcanized casing is closed by a sealing ring 6 which fits in the space between the beads and serves to clamp them tightly to their seats in the mold when the latter is closed under pressure. The sealing ring may be made in any approved form or of any desired material so long as it is capable of sealing the tire casing in a fluid-tight manner. In the present instance, however, the ring (which corresponds in shape to the inner radial or base portion of the customary air bag) consists of a rubber body portion $6^a$ and a series of rubberized reinforcing cords $6^b$, which latter are wrapped or wound under considerable tension into the form of a multi-ply band of substantially V-shape in cross section encircling the rubber body portion and laid in a correspondingly shaped groove formed in the outer periphery of the body portion. It will be evident that the band may be built up from a single length of cord, or from a series of separate plies or layers of cords. After applying the reinforcing band, a thin sheet of rubber 6c is added to cover it and to form the outer face of the ring. In the manufacture of the ring, it may be vulcanized in the form described, or, as preferred, the rubber body portion is first vulcanized and the reinforcing band later applied. Inasmuch as the sealing ring is to be used over and over again as many times as possible, it is desirable that the rubber stock employed be such as will be capable of withstanding the repeated heating and cooling to which the ring is subjected in the succeeding vulcanizing operations. While other stocks are available, the compounded stock heretofore used for air bags will answer the purpose quite satisfactorily.

While the sealing ring might be made wholly of rubber, the reinforcing band above described will serve to preserve it in its original size and shape without interfering with its flexible or yielding properties. If made wholly of rubber, the ring might have a tendency to enlarge by repeated use, or to be distorted from its proper sealing position when the mold sections are pressed together preparatory to vulcanization. Any such tendencies wil be resisted and overcome by the use of the above reinforcing band, which is substantially inextensible. The reinforcing band could be made of wire cords or cables or otherwise, but the use of fibrous cords is particularly desirable because they will have enough elasticity to allow the rubber body portion to yield or become distorted when necessary and then restore it to its proper sealing position. By properly tensioning the cords, the sealing ring will be maintained of the proper size and shape to function for many cures without leakage and without permitting improper flow or distortion of the material of the casing at the beads.

Figure 3:
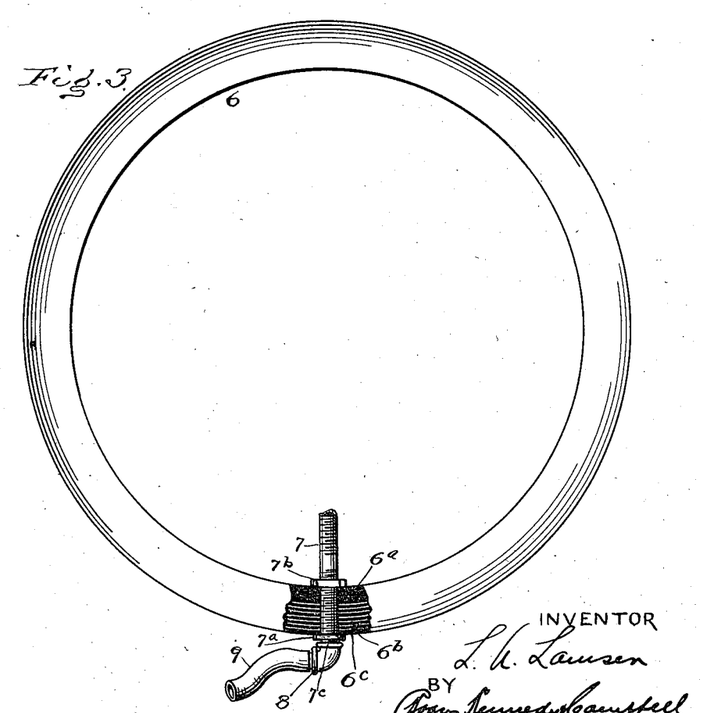
Fig. 3 is an elevation of the improved sealing ring employed.

As shown in Figs. 2 and 3, the sealing ring 6 is provided with a fluid conducting pipe 7 which corresponds to the ordinary valve stem of the old air bag, and which is vulcanized in place in the same way. The pipe extends centrally and radially through the ring and is provided with the customary fixed collar 7a and nut 7b by means of which it is clamped securely to the ring. At its outer end (i. e., the end located outside of the tire cavity), the pipe 7 is threaded as usual for connection with the exterior piping. However, and in contradistinction to the ordinary valve stem, the pipe 7 is provided at its inner end (i. e. the end located within the tire cavity) with a threaded extension 7c fitted with an L-shaped nipple 8, which as shown extends in the direction of the circumference of the ring, and lies within the circumferential plane thereof; and there is attached to said nipple a flexible hose section 9 (of rubber or any other suitable material) which rests at its free end upon the bottom side of the tire cavity at its lowest point. This improved arrangement will insure the proper drainage of the water from the sealed casings after vulcanization, readily adapting itself to casings of different size and automatically positioning itself within the interior cavities whether the sealing ring be placed therein with one side up or the other.

Figure 1:
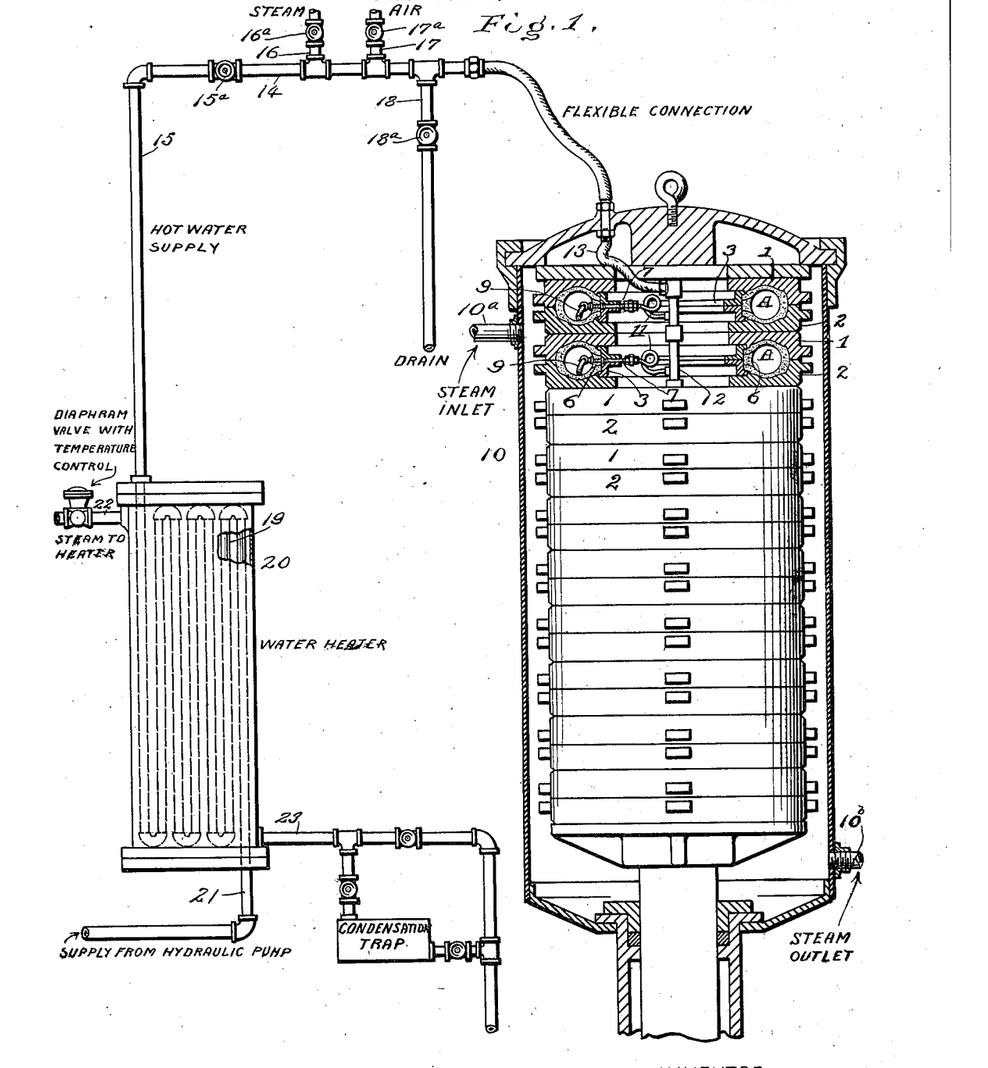
Fig. 1 illustrates, more or less diagrammatically, the adaptation of the invention to a vertical vulcanizer or pot heater, which latter is shown in vertical section.

In Fig. 1, a vertical vulcanizer or pot heater 10 is shown as containing a stack of tire filled molds all ready for the vulcanizing operation. Steam is admitted into the heater through a pipe 10a at the top and passes off through a pipe 10b at the bottom. The construction and operation of this heater are so well known that any further description would be superfluous. As will be observed, the fluid conducting pipes 7 of the various molds are all connected by pipe coils or pigtail couplings 11 to a vertical central stack of pipe sections 12, which latter are arranged end to end in a detachable but fluid-tight manner, and the topmost one of which is connected to a flexible hose 13. This method of connecting the molds in series to a common supply line or manifold is also old and in itself forms no part of the present invention, which in this respect is primarily concerned with the handling of the air, steam and water in the required manner, as will now be described.

As shown in Fig. 1, the flexible hose 13 is connected to a main pipe line 14 into which leads a hot water supply pipe 15 with a cut-off valve 15a, a steam supply pipe 16 with a cut-off valve 16a, and an air supply pipe 17 with a cut-off valve 17a. There also leads from the main pipe line a drain pipe 18 with a cut-off valve 18a.

For the apparatus under discussion, it is preferred that the water be heated to a temperature above the normal curing temperature and subjected to a pressure substantially in excess of the pressure of steam at the corresponding temperature. These conditions can be met in a variety of ways, one simple and satisfactory form of apparatus being illustrated herein by way of example. In this embodiment, the hot water pipe 15 is connected to a water heating coil 19 located within a jacket or casing 20 and supplied with cold water by a pipe 21 under the pressure of a suitable hydraulic pump (not shown). The water in its passage through the coil 19 is heated by steam admitted into the jacket or casing 20 by a supply pipe 22 arranged at the top and which passes off at the bottom through a discharge pipe 23 provided with the usual condensation trap. If desired, the steam pipe 22 may be provided with a thermostatically controlled valve to maintain the hot water at the proper temperature.

To carry out the process the apparatus may be operated as follows: Steam from the supply pipe 16 is first admitted into the sealed tire casings, entering through the fluid conducting pipes 7, which, as above described, are all connected to the main pipe line 14, and this operation is continued for about five minutes. Thereafter, the steam supply is cut off by closing the valve 16a, and the valve 18a of the drain pipe 18 is opened to vent the casings to the atmosphere. The trapped air, being heavier than steam, settles down into the lower portions of the tire casings and is forced out through the flexible hose sections 9 arranged at the bottoms of the interior cavities. This operation will require about one minute. The steam when first admitted into the sealed casings may be under a pressure of from 75 to 100 lbs. although this pressure will be immediately reduced by condensation and then gradually built up again as the casing is heated. Consequently, when the drain pipe is opened, the steam pressure (even though it may not have reached the original pressure) will be sufficient to expel the air. Next, and before the pressure within the sealed casing is spent, the valve 18a is closed and the valve 15a opened to admit the hot water into the sealed casings. This operation will require only a short time, inasmuch as the water, being under a pressure of 150 lbs. or so, will rapidly fill the casings. Any steam remaining in the casings will be condensed into water, so that they will be entirely filled with water with no steam or air present. Thereafter, steam is admitted into the pot heater 10 and the vulcanization of the casings put under way. It is rather important that the casings be filled with water before steam is admitted into the pot heater, as otherwise the steam would be apt to enter between the mold sections and condense in the space between the outsides of the casings and the mold cavities. This condition cannot arise if the casings are first filled with water, because they will then be held in intimate contact with the mold walls and will prevent the entrance of steam into the mold cavities. During the vulcanizing period, the valve 15ª should be left opened in order that the water within the sealed casings may be maintained at the desired pressure. After vulcanization, the valve 15ª is closed, and the valve 18ª of the drain pipe 18 again opened to allow the water to be removed from the tire casings. Since the drain pipe is open to the atmosphere, the water will be forced out of the casings under its own pressure, escaping through the flexible hose sections 9 which insure its complete drainage. As before explained, during drainage, the water and steam generated therefrom will continue to heat the casings and complete their vulcanization. If it is desired to hasten the removal of the water, especially near the end of the drainage period, air under pressure from the pipe line 17 may be admitted into the tire casings by temporarily closing the drain pipe valve 18ª and opening the air pipe valve 17ª to build up enough pressure within the casings to expel the water at the desired speed. After the water has thus been drained from the tire casings, the molds are taken from the pot heater 10 in the usual way and the vulcanized casings removed from the molds. Any moisture remaining within the casings will quickly pass off in the form of steam or vapor when the interior cavities are fully exposed to the atmosphere by the removal of the curing rims and the sealing rings.

Instead of allowing the water to remain in the casings during vulcanization as above described, the water may be circulated continuously through the casings, as in the adaptation next described, in which case the water need only be heated to normal curing temperature.

Figure 4:
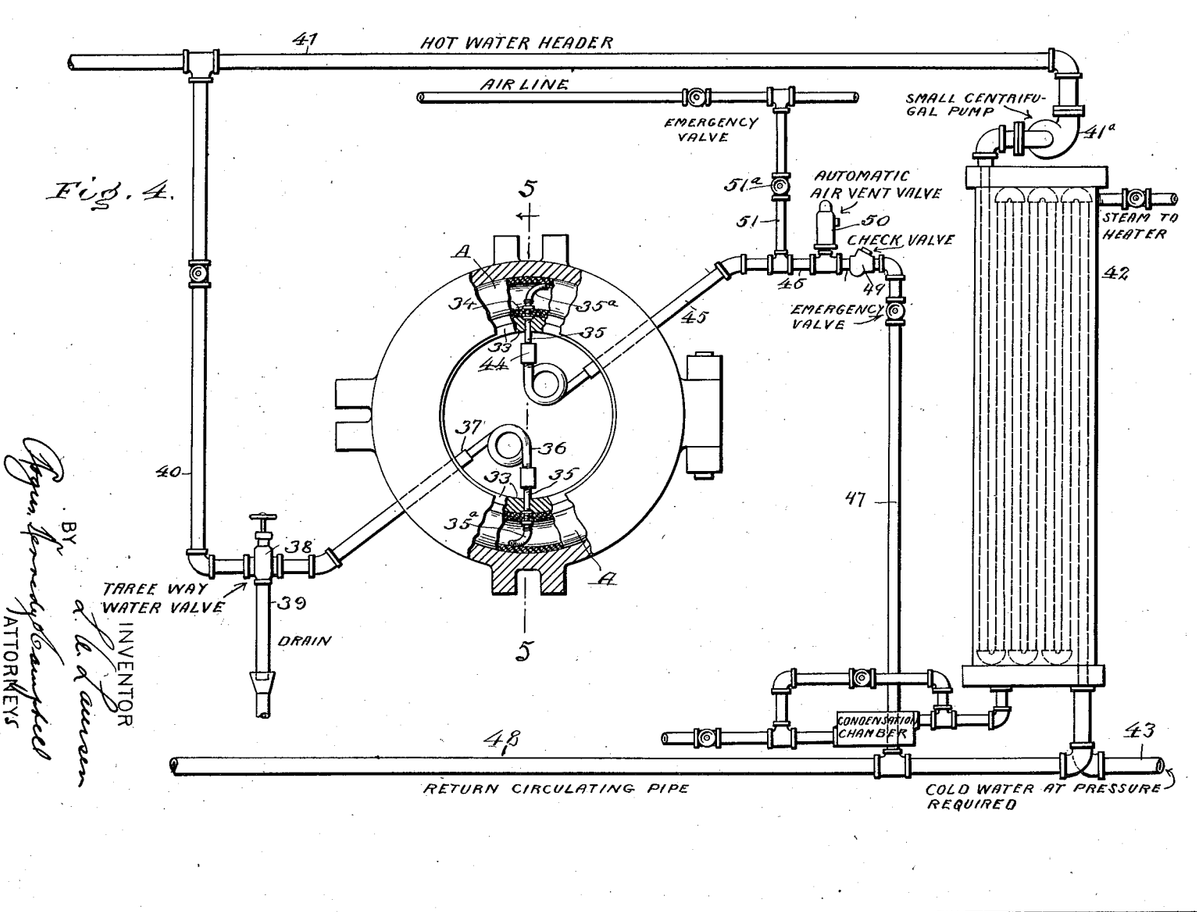
Fig. 4 illustrates, more or less diagrammatically, the adaptation of the invention to an individual vulcanizing unit.
Figure 5:
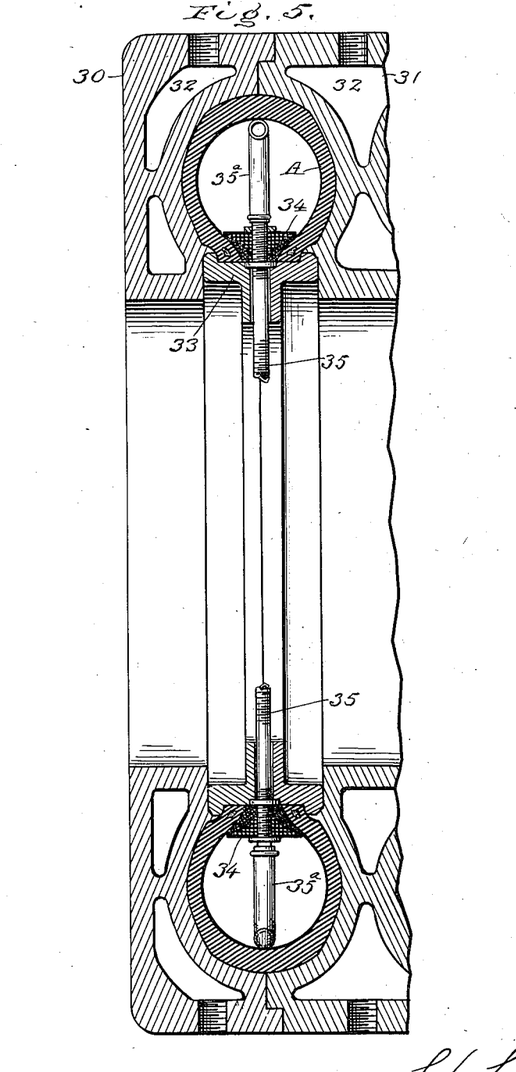
Fig. 5 is a vertical transverse section taken on the line 5—5 of Fig. 4.

Reference will now be made to Figs. 4 and 5, which illustrate an installation suitable for individual vulcanizing units such as are commonly known in the trade as "book type vulcanizers" or "watch case heaters". In these units, as indicated in Fig. 5, the mold sections 30 and 31 are arranged upright or vertically, one being fixed and the other hinged so that the two may be closed together under pressure or swung apart as required; and each mold section is jacketed or chambered to provide heating spaces 32 into which steam or some other heating medium is admitted to carry out the vulcanizing operation. The green or unvulcanized casing A, shown as filling the mold cavity, is mounted upon a curing rim 33 and has its interior closed by a sealing ring 34. Both of these elements are of substantially the same construction as previously described, although it is pointed out that in this instance the sealing ring (which stands vertically in the mold), is provided with two diametrically opposite fluid conducting pipes 35. These pipes 35 are vulcanized and clamped to the sealing ring in the same way as the pipe 7 of the first embodiment, and are provided with flexible hose sections 35ª which are made long enough to reach to the highest and lowest points of the tire cavity and which are turned over at their free open ends so as to face circumferentially in order that the fluid may enter or leave the cavity without injuring the rubber at those points. As a result of this disposition of the two pipes 35, water admitted through the lower pipe and as it rises within the casing will force the air upwardly and drive it out through the upper pipe, although most of the air will be expelled by the steam generated from the water when it first enters the casing.

As shown in Fig. 4, the lower pipe 35 is connected by a coiled pipe or pigtail coupling 36 to a short pipe section 37 which in turn is coupled to a valve casing 38 containing a three-way valve. Leading off from the valve casing is a drain pipe 39, and leading into it is a branch pipe 40 of a main water supply line 41 (the latter in practice serving a series or battery of vulcanizing units). The main pipe line 41 is connected through the medium of a small centrifugal pump 41ª to a water heater 42 which is similar in all respects to that first described, and which is supplied with cold water under pressure from a feed pipe 43. The upper pipe 35 is connected by a coiled pipe or pigtail coupling 44 to a short pipe section 45 branching off from a header pipe 46, which latter is connected by a pipe 47 to a return pipe 48 (which likewise may serve a series or battery of vulcanizing units) leading back to the heater 42 either directly or through the medium of the cold water pipe 43 as shown. The header pipe 46 is provided with an automatic air vent valve 50 which will permit the escape of air without permitting the escape of water, and at a point beyond the valve 50, the header pipe is also provided with a check valve 49 which permits the water to flow through in one direction only, viz., from the tire casing to the heater. There is also connected to the header pipe an air supply pipe 51 having a cut-off valve 51ª. Emergency or automatic pressure relief valves are located at different points in the system as indicated diagrammatically.

The operation of the apparatus is as follows: The three-way valve in the valve casing 38 is first set to close the drain pipe 39 and open up communication between the hot water supply line 41 and the interior cavity of the sealed tire casing, the water entering the latter through the fluid conducting pipe 35 located at the bottom. As before explained, the water or the steam flashing from it will drive the air out through the fluid conducting pipe 35 at the top, the air escaping to the atmosphere through the automatic vent valve 50. In lieu of such automatic vent valve, the header pipe may be provided with an air dome in which the air will be compressed. Upon filling the casing, the water will flow out through the upper pipe 35 and be conducted by the return pipe 48 back to the water heater 42 under the differential pressure created by the centrifugal pump 41ª. In this way, the water is caused to circulate around and around through the closed system thus provided, being heated to and maintained at the desired vulcanizing temperature by the heater 42. In this instance, there is no need of heating the water above the normal vulcanizing temperature, as it will of course be maintained at that temperature by its continuous circulation through the heater. This feature of circulating the water is particularly useful in connection with vertically disposed molds owing to the tendency of the hot water to collect at the top and of the cool water to collect at the bottom. By keeping the water in continuous motion or circulation, the tire casing will be subjected to a substantially uniform heating throughout and hence will be uniformly vulcanized. During its circulation, the water will of course be maintained under the desired pressure, which, as above stated, may be in the neighborhood of 150 lbs. to the square inch. In practice, steam or other heating medium is continuously supplied to the heating jacket surrounding the mold, so that when the casing is filled with water the vulcanizing operation immediately begins. After vulcanization, the three-way valve in the valve casing 38 is set so as to shut off the hot water supply and place the drain pipe 39 in communication with the tire cavity through the lower fluid conducting pipe 35. The water, as in the first case, will pass out under its own pressure or the pressure of steam generated from it, but if desired, by opening the valve 51ª, air under pressure from the pipe line 51 may be admitted into the tire cavity through the fluid conducting pipe 35 at the top to hasten the removal of the water, and any remaining steam. During drainage, the check valve 49 will prevent water from the heater flowing back into the casing. The mold is next opened by swinging to one side the hinged mold section and the vulcanized tire casing may then be taken out, after disconnecting the fluid conducting pipes 35 from their respective couplings. The casing is then dismounted from the curing rim and the sealing ring withdrawn, any moisture remaining within the casing quickly evaporating and leaving the casing in a dry condition.

The invention is of course susceptible of many modifications and variations, both as regards the method and the apparatus, without departing from its spirit. Such modifications will readily suggest themselves to those skilled in the art, and it is therefore to be understood that the invention is not limited to any particular procedure except in so far as such limitations are specified in the claims.

In using the expressions "tire" or "tire casing" herein, it is intended to include the whole structure or merely the carcass portion, it being apparent that it would be feasible to vulcanize the carcass portion alone in accordance with this invention, and later apply the tread and side walls. However, in order to derive the full benefits of the invention, it is recommended that the whole tire casing be vulcanized at one operation in the manner herein shown and described.

This application is a continuation in part of an application filed by me November 25, 1925, Serial No. 71,745.

Having thus described my invention, what I claim is:

1. The process of making a tire casing composed of a rubber body portion, beads, and reinforcing cords embedded in the body portion and anchored to the beads, which consists in providing a suitable vulcanizing mold, building the tire casing in green or unvulcanized condition of a size to substantially fill the mold cavity so as to be substantially incapable of expansion within the mold when inflated, placing the unvulcanized casing in said mold cavity, sealing the interior the of the casing at the beads, admitting into the sealed casing water under pressure to hold it in its unexpanded condition firmly against the mold walls and causing the water to penetrate the rubber body portion, and then vulcanizing the casing in that condition.

2. The process of making a tire casing composed of a rubber body portion, beads, and reinforcing cords embedded in the body portion and anchored to the beads, which consists in providing a suitable vulcanizing mold, building the tire casing in green or unvulcanized condition of a size to substantially fill the mold cavity so as to be substantially incapable of expansion within the mold when inflated, placing the unvulcanized casing in said mold cavity, sealing the interior of the casing at the beads, admitting into the sealed casing water pre-heated to a vulcanizing temperature and under pressure in excess of the temperature pressure so as to cause the water to hold the casing in its unexpanded condition firmly against the mold walls and to penetrate the rubber body portion, and applying heat to the molds to effect vulcanization.

3. The process of making a tire casing composed of a rubber body portion, beads, and reinforcing cords embedded in the body portion and anchored to the beads, which consists in providing a suitable vulcanizing mold, building the tire casing in green or unvulcanized condition of a size to substantially fill the mold cavity so as to be substantially incapable of expansion within the mold when inflated, placing the unvulcanized casing in said mold cavity, sealing the interior of the casing at the beads, admitting into the sealed casing water under pressure, and then vulcanizing the casing.

4. The process of making a tire casing composed of a rubber body portion, beads, and reinforcing cords embedded in the body portion and anchored to the beads, which consists in building the tire casing in green or unvulcanized condition and placing it in a suitable vulcanizing mold, sealing the interior of the casing at the beads, admitting into the sealed casing for direct contact therewith water pre-heated to a vulcanizing temperature and under pressure in excess of the temperature pressure, and applying heat to the molds to effect vulcanization.

5. The process according to claim 4, characterized by the fact that the water when admitted into the sealed casing is heated to a temperature materially in excess of the mold vulcanizing temperature and under a pressure greater than the excess temperature pressure, for the purpose described.

6. The process according to claim 4, including the further step of removing the air from the sealed casing prior to the filling of the same with water.

7. The process according to claim 4, including the further step of admitting steam into the sealed casing while the latter is open to the atmosphere to expel air therefrom before it is filled with water.

8. The process according to claim 4 including the further step of draining the water from the tire casing after vulcanization before the casing is removed from the mold.

9. The process according to claim 4, including the further step of opening the interior of the sealed casing to the atmosphere after vulcanization and allowing the water to drain off under its own steam pressure before the casing is removed from the mold.

10. The process according to claim 4, including the further step of admitting air under pressure into the sealed casing after vulcanization to expel the water therefrom before the casing is removed from the mold.

11. The process according to claim 4, characterized by the fact that bead portions of the unvulcanized casing have an inside diameter substantially equal to the diameter of the mold seats so as merely to fit said mold seats snugly and thus to avoid any substantial compression on the undersides of the beads.

12. The process of vulcanizing a tire casing, which comprises the steps of sealing the green or unvulcanized casing at the beads and admitting into the sealed casing for direct contact therewith a fluid pressure medium, characterized by the fact that the green or unvulcanized casing is built up of two or more plies or layers of cords, and that the cords of the innermost ply are arranged at such an angle that the strain or load imposed thereon by an expansion of the casing will be less than that imposed upon the cords of some other ply or plies.

13. The process of vulcanizing a tire casing, which comprises the steps of sealing the green or unvulcanized casing at the beads and admitting into the sealed casing for direct contact therewith a fluid pressure medium, characterized by the fact that the green or unvulcanized casing is built up of two or more plies or layers of cords, and that the cords of the different plies are arranged at different angles, such that an expansion of the casing will subject each inner ply to less strain or load than that imposed on the adjoining outer ply.

14. The process of making a tire casing, which consists in building the casing in green or unvulcanized condition and placing it in a suitable vulcanizing mold, sealing the interior of the casing at the beads, then admitting steam into the sealed casing while permitting the escape therefrom of air heated up by the steam, thereafter admitting into the sealed casing while closed to the atmosphere water heated to a vulcanizing temperature and under a pressure in excess of the temperature pressure whereby to effect vulcanization of the tire from within, and at or about the same time applying heat to the mold to effect vulcanization of the tire from without.

15. The process according to claim 14, including as a further step after vulcanization the draining of the water from the sealed casing under its own steam pressure.

16. The process according to claim 14, including as a further step after vulcanization the admission of air under pressure into the sealed casing to expel the water therefrom under the pressure of the air.

17. The process according to claim 4 including the further steps of draining the water from the tire casing after vulcanization and drying out the tire casing before removing it from the vulcanizing mold.

18. The process according to claim 4 including the further steps of draining the water from the tire casing after vulcanization and heating the tire casing sufficiently before it is removed from the mold to drive out the moisture absorbed during vulcanization.

19. The process according to claim 4 including the further steps of draining the water from the tire casing before it is finally removed from the mold, and continuing the application of heat to the mold while the casing is still therein in order to drive out from the inside of the casing the moisture absorbed during vulcanization.

20. The process of vulcanizing a tire casing, which consists in placing the green or unvulcanized casing in a suitable vulcanizing mold, sealing the interior of the casing, filling the sealed casing with water heated to a vulcanizing temperature to vulcanize the casing from the inside, applying heat to the mold to vulcanize the casing from the outside, draining the water from the tire casing before finally removing it from the mold, and continuing the application of heat to the outside of the casing when the water is drained from the inside.

21. The process of vulcanizing a tire casing, which comprises the steps of sealing the green or unvulcanized casing at the beads and admitting into the sealed casing for direct contact therewith a fluid pressure medium, characterized by the fact that the green or unvulcanized casing is built up in pulley-band form of two or more plies or layers of cords, and that the cords of the innermost ply are arranged at an angle to the axial plane of the casing less than that of the cords of some outer ply or plies, for the purpose set forth.

22. The process of vulcanizing a tire casing, which comprises the steps of sealing the green or unvulcanized casing at the beads and admitting into the sealed casing for direct contact therewith a fluid pressure medium, characterized by the fact that the green or unvulcanized casing is built up in pulley-band form of two or more plies or layers of cords, and that the cords of the different plies are arranged at different angles which increase progressively from the innermost to the outermost ply, the angles being measured with reference to the axial plane of the casing.

23. The process of vulcanizing a tire casing, which comprises the steps of sealing the green or unvulcanized casing at the beads and admitting into the sealed casing for direct contact therewith a fluid pressure medium, characterized by the fact that the green or unvulcanized casing is built up on a tire-shaped core of two or more plies or layers of cords, and that the cords of the innermost ply are arranged at an angle to the axial plane of the casing greater than that of the cords of some outer ply or plies for the purpose described.

24. The process of vulcanizing a tire casing, which comprises the steps of sealing the green or unvulcanized casing at the beads and admitting into the sealed casing for direct contact therewith a fluid pressure medium, characterized by the fact that the green or unvulcanized casing is built up on a tire-shaped core of two or more plies or layers of cords, and that the cords of the different plies are arranged at different angles decreasing progressively from the innermost to the outermost ply, the angles being measured with reference to the axial plane of the casing.

25. The process of vulcanizing a tire casing, which comprises the steps of sealing the green or unvulcanized casing at the beads and admitting into the sealed casing for direct contact therewith a fluid pressure medium characterized by the fact that the green or unvulcanized casing is built up of two or more plies or layers of cords, and that the innermost ply is made of decreased width so as to permit slippage of the cords at the beads, for the purpose described.

26. The process of vulcanizing a tire casing, which comprises the steps of sealing the green or unvulcanized casing at the beads and admitting into the sealed casing for direct contact therewith a fluid pressure medium characterized by the fact that the green or unvulcanized casing is built up of two or more plies or layers of cords, and that the innermost ply is so constructed or arranged that the strain or load imposed thereon by an expansion of the casing will be less than that imposed upon the cords of some other ply or plies.

27. The process of vulcanizing a tire casing, which comprises the steps of sealing the green or unvulcanized casing at the beads and admitting into the sealed casing for direct contact therewith a fluid pressure medium characterized by the fact that the green or unvulcanized casing is built up of two or more plies or layers of cords, and that the different plies are so constructed or arranged that an expansion of the casing will subject each inner ply to less strain or load than that imposed on the adjoining outer ply.

28. The process of vulcanizing a tire casing, which consists in sealing the green or unvulcanized casing at the beads, applying vulcanizing heat to the outside of the casing, and simultaneously flowing continuously through the sealed casing for direct contact therewith water preheated to a vulcanizing temperature as high as that of the outside heating medium.

29. The process of vulcanizing a tire casing, which consists in sealing the green or unvulcanized casing at the beads, applying vulcanizing heat to the outside of the casing, and simultaneously flowing continuously through the sealed casing for direct contact therewith water preheated to a vulcanizing temperature as high as that of the outside heating medium and under pressure in excess of the vulcanizing temperature pressure.

30. The process of vulcanizing a tire casing, which consists in placing the green or unvulcanized casing in a suitable mold, sealing the interior of the casing at the beads, applying vulcanizing heat to the outside of the casing, and simultaneously flowing continuously through the sealed casing for direct contact therewith water preheated to a vulcanizing temperature pressure as high as that of the outside heating medium.

31. The process of vulcanizing a tire casing, which consists in placing the green or unvulcanized casing in a suitable mold, sealing the interior of the casing at the beads, applying vulcanizing heat to the outside of the casing, and simultaneously flowing continuously through the sealed casing for direct contact therewith water preheated to a vulcanizing temperature as high as that of the outside heating medium and under pressure in excess of the vulcanizing temperature pressure.

32. The process of vulcanizing a tire casing, which consists in placing the green or unvulcanized casing in a suitable mold, sealing the interior of the casing at the beads, flowing continuously through the sealed casing for direct contact therewith water preheated to a vulcanizing temperature to vulcanize the casing from the inside, and simultaneously applying heat to the mold to vulcanize the casing from the outside, the temperature of the circulating water being as high as that of the mold heating medium.

33. The process of vulcanizing a tire casing, which consists in placing the green or unvulcanized casing in a suitable mold, sealing the interior of the casing at the beads, flowing continuously through the sealed casing for direct contact therewith water preheated to a vulcanizing temperature and under pressure in excess of the vulcanizing temperature pressure to vulcanize the casing from the inside, and simultaneously applying heat to the mold to vulcanize the casing from the outside, the temperature of the circulating water being as high as that of the mold heating medium.

34. In an apparatus for vulcanizing tire casings, the combination of an upright mold formed with a suitable cavity to receive the green or unvulcanized casing, a sealing ring adapted to be inserted in the space between the beads to close the interior of the casing and provided with two fluid conducting pipes leading into the sealed casing from outside the mold, one of said pipes being located at the lowest point within the sealed casing and the other located at the highest point within said casing, a hot water circulating system having its high pressure line connected to the lower conducting pipe and its low pressure line connected to the upper pipe, a drain pipe connected to the high pressure line, a controlling valve mechanism for shutting off the water flow when the drain pipe is opened, and vice versa, and an air pressure supply pipe connected to the low pressure line and provided with a controlling valve.

LAURITS A. LAURSEN.